(12) United States Patent  
Mizutani (10) Patent No.: US 8,731,173 B2  
(45) Date of Patent: May 20, 2014

(54) TELEPHONE EXCHANGE SYSTEM, DIAL-IN INCOMING CALL METHOD THEREOF, AND DIAL-IN INCOMING CALL PROGRAM THEREOF

(75) Inventor: Makoto Mizutani, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/574,394

(22) PCT Filed: Jan. 19, 2011

(86) PCT No.: PCT/JP2011/050810  
§ 371 (c)(1),  
(2), (4) Date: Jul. 20, 2012

(87) PCT Pub. No.: WO2011/090043  
PCT Pub. Date: Jul. 28, 2011

(65) Prior Publication Data  
US 2012/0300919 A1    Nov. 29, 2012

(30) Foreign Application Priority Data

Jan. 22, 2010  (JP) ................................. 2010-011922

(51) Int. Cl.  
*H04M 3/02*  (2006.01)

(52) U.S. Cl.  
USPC ..................................... 379/252; 379/201.01

(58) Field of Classification Search  
USPC .............................. 379/252, 254, 257, 201.01  
See application file for complete search history.

(56) References Cited

U.S. PATENT DOCUMENTS

| | | | | |
|---|---|---|---|---|
| 5,455,855 A | * | 10/1995 | Hokari | ........................... 379/229 |
| 5,475,744 A | * | 12/1995 | Ikeda | ....................... 379/127.01 |
| 5,541,992 A | | 7/1996 | Tsuzuki et al. | |
| 5,790,646 A | | 8/1998 | Moon | |
| 2002/0048358 A1 | * | 4/2002 | Nishida | .................... 379/210.01 |

FOREIGN PATENT DOCUMENTS

| | | |
|---|---|---|
| CN | 1365245 A | 8/2002 |
| JP | 4-290094 A | 10/1992 |
| JP | 10-174132 A | 6/1998 |
| JP | 2003-9198 A | 1/2003 |
| JP | 2003-87835 A | 3/2003 |
| JP | 2003-143631 A | 5/2003 |
| JP | 2008-182753 A | 8/2008 |
| WO | 98-41042 A1 | 9/1998 |

OTHER PUBLICATIONS

International Search Report for PCT/JP2011/050810 dated Mar. 1, 2011.

(Continued)

*Primary Examiner* — William Deane, Jr.  
(74) *Attorney, Agent, or Firm* — Sughrue Mion, PLLC (57) ABSTRACT

A telephone exchange system includes a connection interface connecting a communication line and a plurality of extension telephones, a database having a dial-in conversion table registering a received number in association with a number after conversion for a dial-in incoming call, and an extension number table registering an extension telephone in association with an extension number of the extension telephone, and a main controller connected to the connection interface and the database. When the dial-in incoming call comes from the communication line, the main controller retrieves an extension number which coincides with the received number from the extension number table. When there is an extension number which coincides with the received number, the main controller causes an extension telephone corresponding to the extension number to ring.

7 Claims, 6 Drawing Sheets

232

| EXTENSION PORT NUMBER | EXTENSION NUMBER |
|---|---|
| 1 | 1001 |
| 2 | 1002 |
| 3 | 1003 |
| . | . |

(56) References Cited

OTHER PUBLICATIONS

Office Action dated Jun. 25, 2013 issued by the State Intellectual Property Office of P.R. China in corresponding Chinese Patent Application No. 201180006748.7.

Extended European Search Report dated Jun. 4, 2013 issued by the European Patent Office in corresponding European Patent Application No. 11734649.4.

* cited by examiner

| TABLE NUMBER | RECEIVED NUMBER | NUMBER AFTER CONVERSION |
|---|---|---|
| 1 | 7001 | 1001 |
| 2 | 1003 | 1003 |
| 3 | 6005 | 1005 |
| ⋮ | ⋮ | ⋮ |

| EXTENSION PORT NUMBER | EXTENSION NUMBER |
|---|---|
| 1 | 1001 |
| 2 | 1002 |
| 3 | 1003 |
| ⋮ | ⋮ |

TELEPHONE EXCHANGE SYSTEM, DIAL-IN INCOMING CALL METHOD THEREOF, AND DIAL-IN INCOMING CALL PROGRAM THEREOF

CROSS REFERENCE TO RELATED APPLICATIONS

This application is a National Stage of International Application No. PCT/JP2011/050810 filed Jan. 19, 2011, claiming priority based on Japanese Patent Application No. 2010-011922 filed Jan. 22, 2010, the contents of all of which are incorporated herein by reference in their entirety.

TECHNICAL FIELD

The present invention relates to a telephone exchange system, a dial-in incoming call receiving method, and a program for the dial-in incoming call.

BACKGROUND ART

When a dial-in incoming call is received in a telephone exchange system, the system causes a particular telephone to receive the call by converting a number received from a telephone station into a number used in the system. Therefore, the system holds a table of received numbers of dial-in incoming calls and numbers after conversion, and retrieves the received number and carries out conversion of the received number.

In relation to the above system, Patent Literature 1 discloses a system having an private telephone exchange in which the exchange refers to a dial-in/extension correspondence table when a dial-in incoming call comes, and if there is a registration of a pair of a telephone number of the caller and an external telephone number, the exchange calls an extension telephone of an extension number corresponding to the pair. If there is no registration, the exchange refers to an extension group table and calls all extension telephones which belong to an extension group corresponding to the external telephone number.

Also, Patent Literature 2 discloses a private branch exchange system in which, when a dial-in incoming call comes, the system refers to a dial-in number/extension number connecting thereto correspondence conversion table and converts a received dial-in number into a corresponding extension number. If there is a registration of a number received from the caller in a caller number/extension number correspondence registration table, the system causes a terminal to receive the call, the terminal being connected to a port set to an extension number corresponding to the received caller number. If there is no registration, the system causes a terminal to receive the call, the terminal being connected to a port set to an extension number corresponding to the received dial-in number.

CITATION LIST

Patent Literature

{PTL 1} JP-A-2003-087835
{PTL 2} JP-A-10-174132

SUMMARY OF INVENTION

Technical Problem

However, in the above related technology, it may be necessary to set up many conversion tables of a received number of a dial-in incoming call for operational reasons such as there being many contract lines. In that case, it takes an immense amount of time to set them up.

Here, in the telephone exchange system, there is a limit to the number of tables in which a received number of a dial-in incoming call and a number after conversion are registered. Therefore, even if more registrations are desired than the available numbers of tables that the system can hold, it may be difficult to realize the registration. Also, even if the available numbers of the tables can meet the desire, it takes an immerse amount of time to set up the tables.

An object of the present invention solves the above problem and is directed to provide a telephone exchange system, a dial-in incoming call receiving method, and a program for the dial-in incoming call without setting a conversion table of a received number of a dial-in incoming call, whereby a set up time can be reduced.

Solution to Problem

According to a first exemplary aspect of the present invention, there is provided a telephone exchange system, including:
a connection interface connecting a communication line with a plurality of extension telephones;
a database having a dial-in conversion table registering a received number of a dial-in incoming call from the communication line in association with a number after conversion of the received number, and an extension number table registering the extension telephone in association with an extension number of the extension telephone; and
a main controller connected to the connection interface and the database,
wherein the main controller retrieves an extension number coinciding with the received number from the extension number table when a dial-in incoming call comes from the communication line, and causes an extension telephone corresponding to the extension number to ring when there is the extension number coinciding with the received number.

According to a first exemplary aspect of the present invention, there is provided a dial-in incoming call receiving method of a telephone exchange system including a connection interface connecting a communication line with a plurality of extension telephones, a database having a dial-in conversion table registering a received number of a dial-in incoming call from the communication line in association with a number after conversion of the received number, and an extension number table registering the extension telephone in association with an extension number of the extension telephone, and a main controller connected to the connection interface and the database, the method including:
retrieving, by the main controller, an extension number coinciding with the received number from the extension number table when a dial-in incoming call comes from the communication line; and
causing, by the main controller, an extension telephone corresponding to the extension number to ring when there is the extension number coinciding with the received number.

A program for a dial-in incoming call of a telephone exchange system including a connection interface connecting a communication line with a plurality of extension telephones, a database having a dial-in conversion table registering a received number of a dial-in incoming call from the communication line in association with a number after conversion of the received number, and an extension number table registering the extension telephone in association with an extension number of the extension telephone, and a main controller connected to the connection interface and the database, the program causing a computer configuring the main controller to execute: retrieving an extension number coinciding with the received number from the extension number table when a dial-in incoming call comes from the communication line; and causing an extension telephone corresponding to the extension number to ring when there is an extension number coinciding with the received number.

Advantageous Effects of Invention

According to the present invention, since a recipient of a call can be determined without converting a received number of a dial-in incoming call, it is not necessary to set up a conversion table of the received number of the dial-in incoming call, whereby a set up time can be reduced.

DESCRIPTION OF EMBODIMENTS

Hereinafter, embodiments of a telephone exchange system, a dial-in incoming call receiving method, and a program for the dial-in incoming call according to the present invention will be described in detail with reference to the accompanying drawings.

First Embodiment

Figure 1:
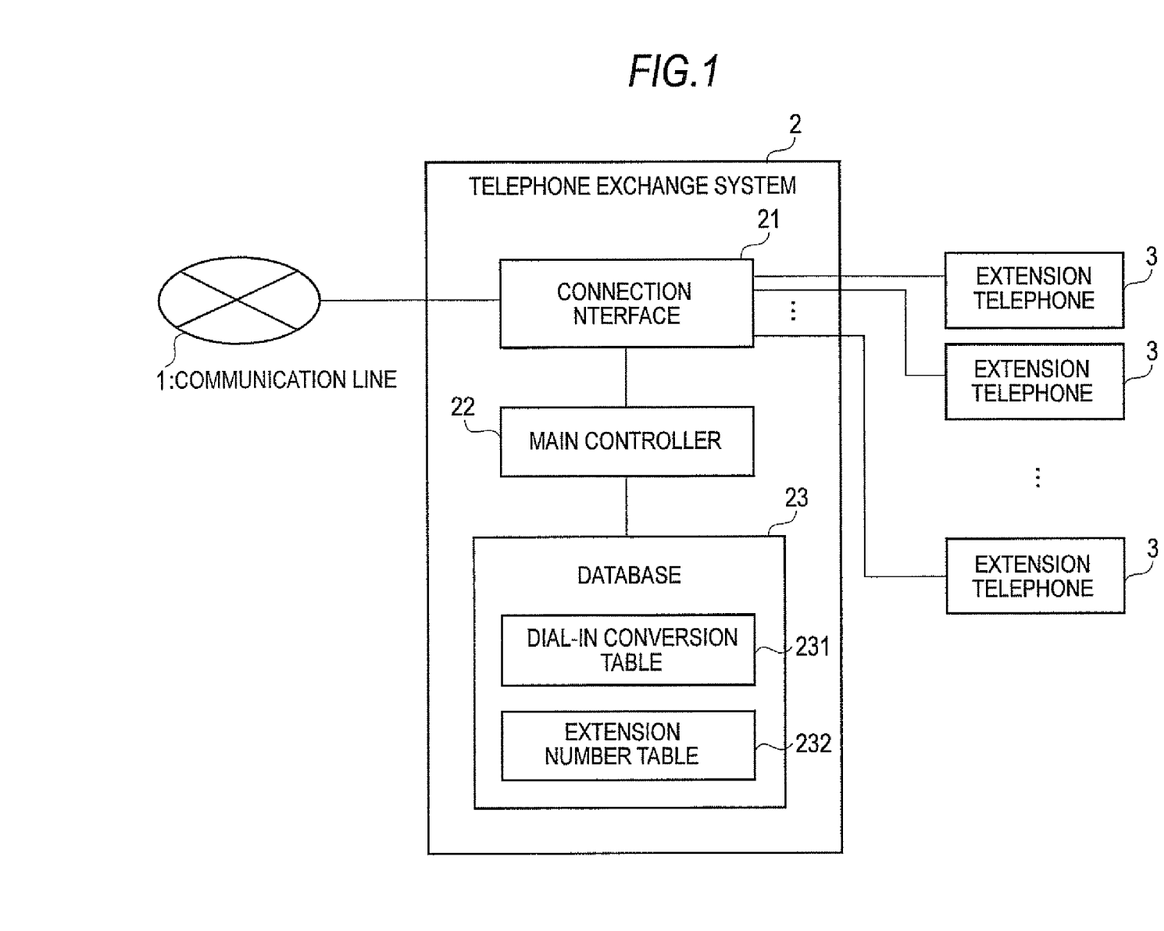
FIG. 1 A schematic block diagram shows an overall configuration of a telephone exchange system according to a first embodiment of the present invention.

FIG. 1 is a diagram showing principal parts of a circuit configuration of a telephone exchange system according to the present embodiment.

A telephone exchange system 2 shown in FIG. 1 has a connection interface 21, a main controller 22, and a database 23. The connection interface 21 connects a communication line 1 with a plurality of extension telephones 3. The communication line 1 includes an analog line, an ISDN (Integrated Services Digital Network) line, an IP (Internet Protocol) line or the like. The main controller 22 is connected to the connection interface 21 and the database 23.

The connection interface 21 connects the communication line 1 with the plurality of extension telephones 3, or the extension telephones 3 with respect to one another via a channel (external) port provided at a side of the communication line 1 and a plurality of extension ports provided at a side of the plurality of extension telephones 3.

The main controller 22 is configured from, for example, a computer (controller) having a CPU (Central Processing Unit) operated under control of a program, and memories (ROM (Read Only Memory), and RAM (Random Access Memory)) which store the control program, various control data and the like. With this configuration, the main controller 22 obtains a received number via the connection interface 21 when a dial-in incoming call comes from the communication line 1, analyzes the received number based on various setting data of the database 23, and carries out a ringing process for the extension telephone 3 via the connection interface 21. This process is carried out by executing the control program set in advance in the memory (not shown), for example.

The database 23 has a storage medium such as a memory and holds the various setting data for operating the telephone exchange system 2. The various setting data includes a dial-in conversion table 231 in which a received number of a dial-in incoming call and a number after conversion of the received number are mutually associated and registered, and an extension number table 232 in which an extension number of the extension telephone 3 and an extension port number which specifies an extension port of the connection interface 21 to which the extension telephone 3 is connected are mutually associated and registered.

Figure 2:
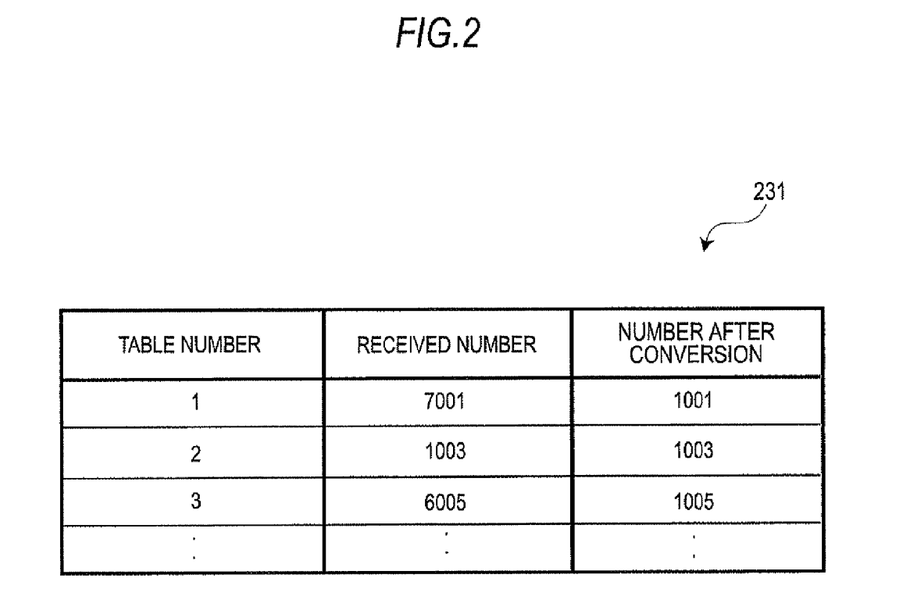
FIG. 2 A diagram shows a specific example of a dial-in conversion table of FIG. 1.

FIG. 2 shows a specific example of the dial-in conversion table 231. In the dial-in conversion table 231 shown in this example, a received number of a dial-in incoming call and a number of after conversion of the received number are mutually associated and registered for each table number.

Figure 3:
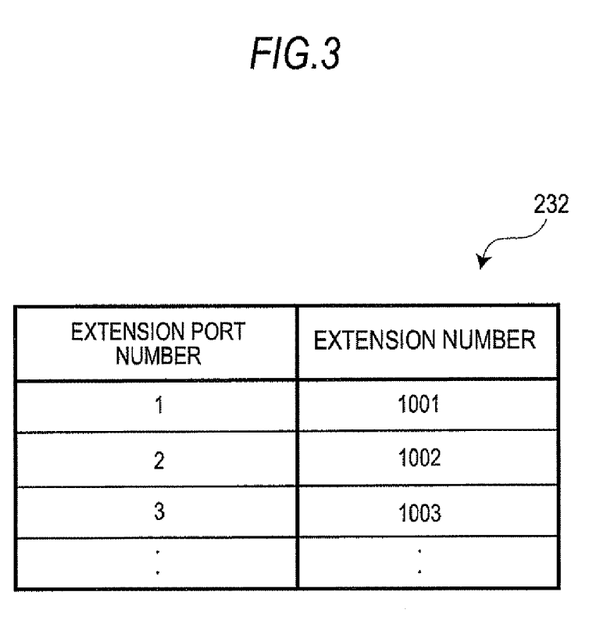
FIG. 3 A diagram shows a specific example of an extension number table of FIG. 1.

FIG. 3 shows a specific example of the extension number table 232. In the extension number table 232 shown in this example, an extension number of the extension telephone 3 and an extension port number of the extension number are mutually associated and registered.

Figure 4:
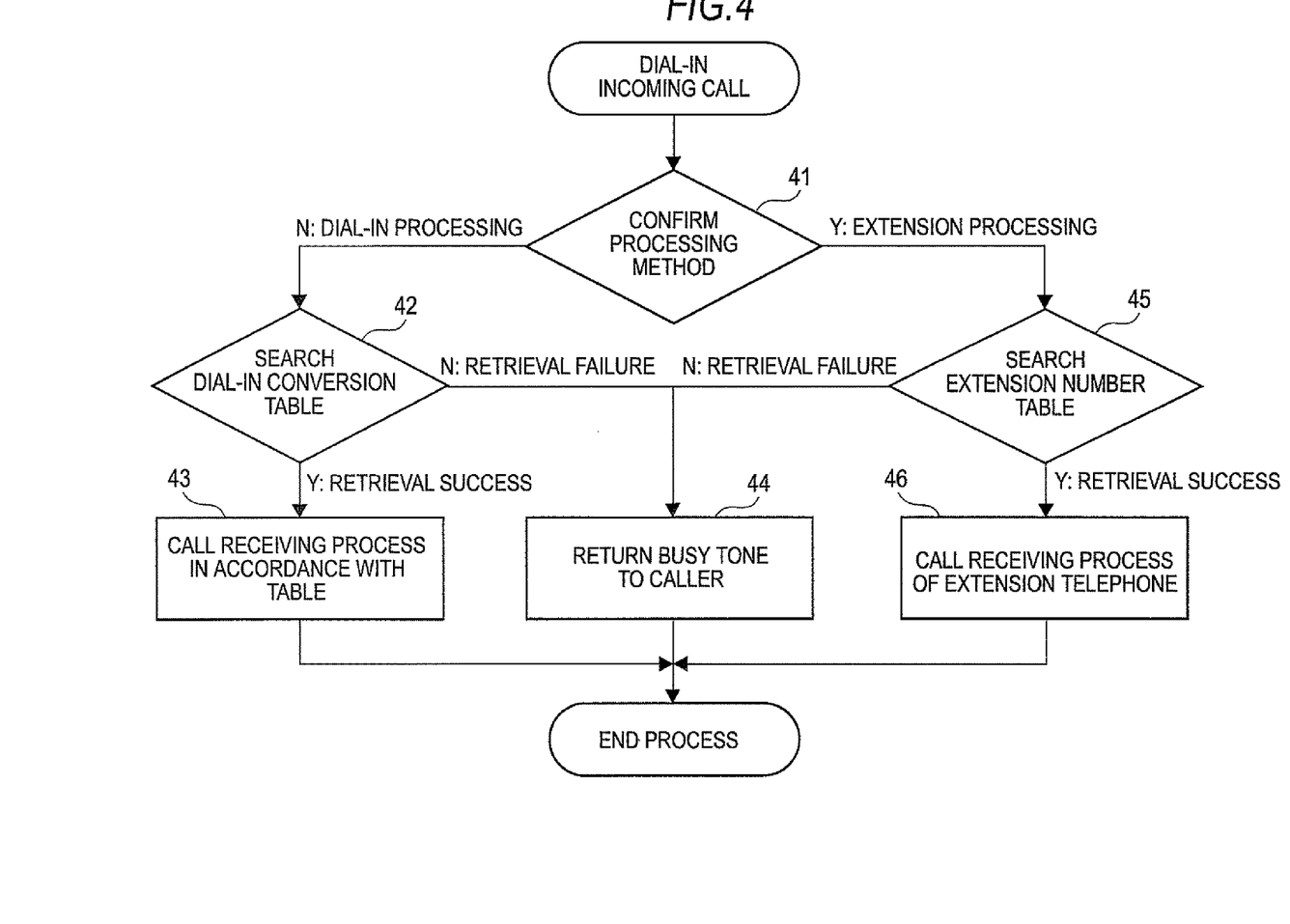
FIG. 4 A schematic flowchart shows an operation when a dial-in incoming call comes in the telephone exchange system of FIG. 1.

FIG. 4 illustrates a flow of a process when a dial-in incoming call is received from the communication line 1, that is, FIG. 4 illustrates a dial-in incoming call receiving method. This process is carried out by the main controller 22 executing the control program (program for dial-in incoming call) set in advance in the memory (not shown).

In the present embodiment, with respect to a processing method when a dial-in incoming call is received by each external line, whether the dial-in conversion table 231 is used or the extension number table 232 is used can be selected and set in advance in the database 23 of the telephone exchange system 2.

First of all, the main controller 22 confirms the processing method from the setting in the database 23 when a dial-in incoming call is received from an external line (Step 41).

As a result, in a case where the dial-in conversion table 231 is used (Step 41: N), the main controller 22 retrieves the received number, which is received when the dial-in incoming call comes, from among received numbers in the dial-in conversion table 231 set in the database 23 (Step 42). As a result, when the received number is found (Step 42: Y), the main controller 22 calls a particular extension telephone 3 connected to an extension port of an extension port number in accordance with an extension number which coincides with a number after conversion corresponding to the retrieved received number according to the setting of the tables (the dial-in conversion table 231 and the extension number table 232) (Step 43). Meanwhile, when the received number is not found in the dial-in conversion table 231 (Step 42: N), the main controller 22 causes the caller to listen to a busy tone (Step 44).

To explain this operation with reference to the examples of FIGS. 2 and 3, when the received number of the dial-in incoming call is "7001", for example, the main controller 22 refers to the dial-in conversion table 231 shown in FIG. 2, and converts the received number "7001" into the number after conversion "1001". Next, the main controller 22 refers to the extension number table 232 shown in FIG. 3, obtains the extension port number "1" corresponding to the extension number "1001" which coincides with the converted number "1001", and causes the extension telephone 3 connected to an extension port of the extension port number "1" to receive the call.

On the other hand, in a case where the processing method when a dial-in incoming call comes is an extension number process (Step 41:Y), the main controller 22 retrieves an extension number which coincides with the received number from a list of extension numbers in the extension number table 232 held in the database 23 (Step 45). As a result, when the extension number which coincides with the received number is found (Step 45: Y), the main controller 22 carries out a calling process with respect to the extension telephone 3 connected to an extension port of an extension port number corresponding to the extension number which coincides with the received number (Step 46). Meanwhile, when the extension number which coincides with the received number is not found (Step 45: N), the main controller 22 causes the caller to listen to a busy tone (Step 44).

To explain the operation with reference to the example of FIG. 3, when the received number of the dial-in incoming call is "1002", for example, the main controller 22 refers to the extension number table 232 shown in FIG. 3, obtains the extension port number "2" corresponding to the extension number "1002" which coincides with the received number "1002", and causes the extension telephone 3 connected to the extension port of the extension port number "2" to receive the call.

According to the above, when the dial-in incoming call is received from the communication line 1, the main controller 22 retrieves an extension number which coincides with the received number from the list of the extension numbers in the extension number table 232 registered in the database 23. When the extension number which coincides with the received number is found, the main controller 22 causes the extension telephone 3 corresponding to the extension number to receive the call. Therefore, the user who uses the extension telephone 3 can answer the dial-in incoming call without being particularly aware that the main controller 22 caused the extension telephone 3 corresponding to the extension number to receive the call.

Therefore, according to the present embodiment, by determining a recipient without converting a received number of a dial-in incoming call, it is not necessary to set up a conversion table of a received number, and therefore, a set up time and man-hours can be substantially reduced.

That is, an installation worker of the telephone exchange system can make a particular extension telephone receive a dial-in incoming call without setting table data for conversion having a dial-in received number and a number after conversion. This is greatly effective when a dial-in received number coincides with a currently operated extension number, and a set up time for installation can be substantially reduced. Further, the user of an extension telephone can answer the call without being aware that the main controller 22 caused the extension telephone 3 corresponding to the extension number to receive the call since there is nothing changed from a previous dial-in incoming call.

Furthermore, by using the telephone exchange system of the present embodiment, a button telephone device, which has a function to transmit a received number of a dial-in incoming call, can be constituted.

Second Embodiment

Next, a second embodiment of the present invention will be described. A telephone exchange system according to the present embodiment has a similar configuration to the first embodiment. However, the operation of when a dial-in incoming call comes as shown in FIG. 4 is different from the first embodiment. Hereinafter, only the difference from the first embodiment will be described.

Figure 5:
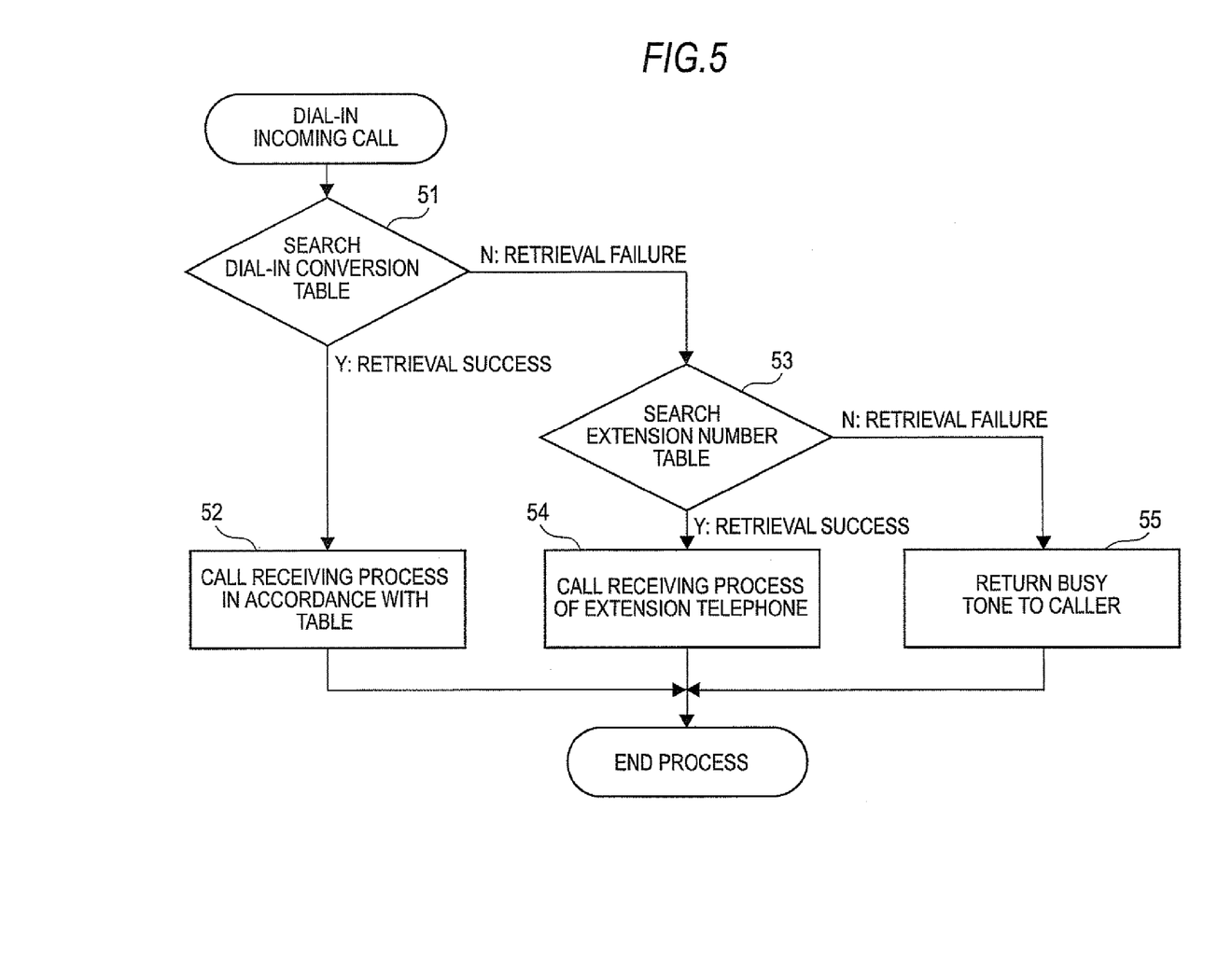
FIG. 5 A schematic flowchart shows an operation when a dial-in incoming call comes in a telephone exchange system according to a second embodiment of the present invention.

FIG. 5 illustrates an operation of the telephone exchange system when a dial-in incoming call is received according to the present embodiment. This process is carried out by the main controller 22 executing a control program (program for dial-in incoming call) set in advance in a memory (not shown).

First of all, when a dial-in incoming call is received from an external line, the main controller 22 retrieves the received number, which is received when the dial-in incoming call comes, from among received numbers in the dial-in conversion table 231 set in the database 23 (Step 51).

As a result, when the received number is found (Step 51: Y), the main controller 22 calls a particular extension telephone 3 connected to an extension port of an extension port number in accordance with an extension number which coincides with a number after conversion corresponding to the retrieved received number according to the setting of the tables (the dial-in conversion table 231 and the extension number table 232) (Step 52).

Meanwhile, when the received number is not found in the dial-in conversion table 231 (Step 51: N), the main controller 22 retrieves an extension number which coincides with the received number from a list of extension numbers in the extension number table 232 held in the database 23 (Step 53). As a result, when the extension number which coincides with the received number is found (Step 53: Y), the main controller 22 carries out a calling process with respect to the extension telephone 3 connected to an extension port of an extension port number corresponding to the extension number which coincides with the received number (Step 54). Meanwhile, when the extension number which coincides with the received number is not found (Step 53: N), the main controller 22 causes the caller to listen to a busy tone (Step 55).

To explain this operation with reference to the examples of FIGS. 2 and 3, when the received number of the dial-in incoming call is "7001", for example, the main controller 22 refers to the dial-in conversion table 231 shown in FIG. 2, and converts the received number "7001" into the number after conversion "1001". Next, the main controller 22 refers to the extension number table 232 shown in FIG. 3, obtains the extension port number "1" corresponding to the extension number "1001" which coincides with the converted number "1001", and causes the extension telephone 3 connected to the extension port of the extension port number "1" to receive the call.

In contrast, when the received number of the dial-in incoming call is "1002", there is not the received number "1002" even though the main controller refers to the dial-in conversion table 231 shown in FIG. 2. Therefore, the main controller 22 refers to the extension number table 232 shown in FIG. 3, obtains the extension port number "2" corresponding to the extension number "1002" which coincides with the received number "1002", and causes the extension telephone 3 connected to the extension port of the extension port number "2" to receive the call.

Therefore, according to the present embodiment, when a dial-in incoming call comes from the communication line 1, an extension number which coincides with the received number is retrieved from the list of the extension number table 232 when the received number is not found in the dial-in conversion table 231. When the extension number which coincides with the received number is found, the extension telephone 3 corresponding to the extension number is caused to ring and receive the call. In this case, similar to the first embodiment, the user who uses the extension telephone 3 can answer the call without being particularly aware that the main controller 22 caused the extension telephone 3 corresponding to the extension number to receive the call.

Third Embodiment

Next, a third embodiment of the present invention will be described. A telephone exchange system according to the present embodiment has a similar configuration to the first embodiment. However, among the operations shown in FIG. 4 when a dial-in incoming call comes, the operation of Step 42 is different. Hereinafter, only the difference from the first embodiment will be described.

Figure 6:
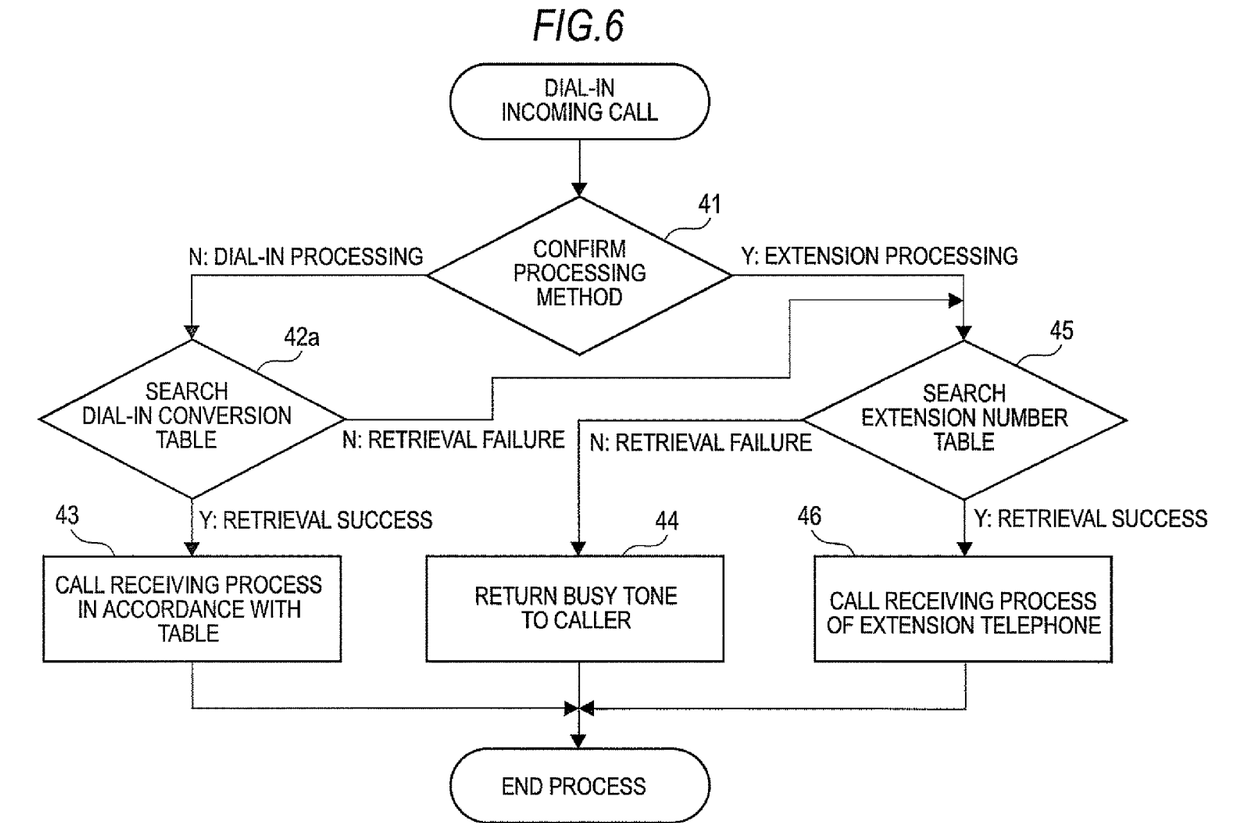
FIG. 6 A schematic flowchart shows an operation when a dial-in incoming call comes in a telephone exchange system according to a third embodiment of the present invention.

FIG. 6 illustrates an operation of the telephone exchange system according to the present embodiment when a dial-in incoming call comes. This process is carried out by the main controller 22 executing a control program (program for dial-in incoming call) set in advance in a memory (not shown).

In the example of FIG. 4, in a case where the dial-in conversion table 231 is used, when the received number is not found in the dial-in conversion table 231 (Step 42: N), the main controller 22 causes the caller to listen to a busy tone (Step 44).

In contrast, in the example of FIG. 6, in a case where the dial-in conversion table 231 is used, when the received number is not found in the dial-in conversion table 231 (Step 42a: N), the process proceeds to Step 45 where the extension number table 232 is used, and hereinafter, similar operations to the case where the extension number table 232 is used are carried out. Other operations are similar to those of FIG. 4.

Therefore, in the present embodiment, even when the dial-in conversion table 231 is used by the user's selection, if the received number is not found in the dial-in conversion table 231, an extension number which coincides with the received number is retrieved from the list of the extension number table 232, and the extension telephone 3 corresponding to the found extension number is caused to ring and receive the call. In this case, similar to the first embodiment, the user who uses the extension telephone 3 can answer the dial-in incoming call without being especially aware that the main controller 22 caused the extension telephone 3 corresponding to the extension number to receive the call.

Note that, in the above each embodiment, it has become possible that a particular extension telephone is rung without setting the dial-in conversion table when a dial-in incoming call comes. It may also be possible, with respect to a received number, to transfer a call to a mobile phone from a designated external line or to ring an extension telephone which is accommodated in other interconnected telephone exchange system by adding or deleting the received number.

Further, the telephone exchange system and the dial-in incoming call receiving method according to each embodiment can be realized by hardware, software, or a combination thereof.

For example, the telephone exchange system according to each embodiment can be realized by hardware. However, it can also be realized by a computer loading a program (program for dial-in incoming call) from a computer-readable recording medium and executing the program, the program causing the computer to function as the telephone exchange system.

Furthermore, the dial-in incoming call receiving method of the telephone exchange system according to each embodiment can be realized by hardware. However, it can be also realized by a computer loading a program (program for dial-in incoming call) from a computer-readable recording medium and executing the program, the program causing the computer to execute the dial-in incoming call receiving method.

Furthermore, the hardware and software configuration described above is not particularly limited, and any configuration is applicable as long as the functions of each configuration element described above can be realized. For example, either a configuration in which a circuit, a component or the like is independently assembled for each function of each configuration element, or a configuration in which the several functions are incorporated into a circuit, a component or the like to constitute the configuration in a unified manner is applicable. Furthermore, it may also be possible to provide a telephone system (telephone device) having the telephone exchange system 2 according to each embodiment and a plurality of the extension telephones 3 connected to the telephone exchange system 2.

The whole or part of the exemplary embodiments above can be described as the following supplementary notes, but are not limited thereto.

(Supplementary note 1) A telephone exchange system, comprising:
a connection interface connecting a communication line with a plurality of extension telephones;
a database having a dial-in conversion table registering a received number of a dial-in incoming call from the communication line in association with a number after conversion of the received number, and an extension number table registering the extension telephone in association with an extension number of the extension telephone; and
a main controller connected to the connection interface and the database,
wherein the main controller retrieves an extension number coinciding with the received number from the extension number table when a dial-in incoming call comes from the communication line, and causes an extension telephone corresponding to the extension number to ring when there is the extension number coinciding with the received number.

(Supplementary note 2) The telephone exchange system according to supplementary note 1,
wherein the main controller sets in advance whether the dial-in conversion table is used or the extension number table is used when the dial-in incoming call comes and, in the case where the extension number table is used, retrieves the extension number coinciding with the received number from the extension number table when the dial-in incoming call comes, and causes the extension telephone corresponding to the extension number to ring when there is the extension number coinciding with the received number.

(Supplementary note 3) The telephone exchange system according to supplementary note 1,
wherein the main controller retrieves the number after conversion coinciding with the received number from the dial-in conversion table when the dial-in incoming call comes, retrieves the extension number coinciding with the received number from the extension number table when there is no number after conversion coinciding with the received number, and causes the extension telephone corresponding to the extension number to ring when there is the extension number coinciding with the received number.

(Supplementary note 4) The telephone exchange system according to supplementary note 1, wherein the main controller sets in advance whether the dial-in conversion table is used or the extension number table is used when the dial-in incoming call comes and, in the case where the dial-in conversion table is used, retrieves the number after conversion coinciding with the received number from the dial-in conversion table when the dial-in incoming call comes, retrieves the extension number coinciding with the received number from the extension number table when there is no number after conversion coinciding with the received number, and causes the extension telephone corresponding to the extension number to ring when there is the extension number coinciding with the received number.

(Supplementary note 5) A dial-in incoming call receiving method of a telephone exchange system including a connection interface connecting a communication line with a plurality of extension telephones, a database having a dial-in conversion table registering a received number of a dial-in incoming call from the communication line in association with a number after conversion of the received number, and an extension number table registering the extension telephone in association with an extension number of the extension telephone, and a main controller connected to the connection interface and the database, the method comprising:

retrieving, by the main controller, an extension number coinciding with the received number from the extension number table when a dial-in incoming call comes from the communication line; and causing, by the main controller, an extension telephone corresponding to the extension number to ring when there is the extension number coinciding with the received number.

(Supplementary note 6) The dial-in incoming call receiving method according to supplementary note 5, wherein the main controller sets in advance whether the dial-in conversion table is used or the extension number table is used when the dial-in incoming call comes and, in the case where the extension number table is used, retrieves the extension number coinciding with the received number from the extension number table when the dial-in incoming call comes, and causes the extension telephone corresponding to the extension number to ring when there is the extension number coinciding with the received number.

(Supplementary note 7) The dial-in incoming call receiving method according to supplementary note 5, wherein the main controller retrieves the number after conversion coinciding with the received number from the dial-in conversion table when the dial-in incoming call comes, retrieves the extension number coinciding with the received number from the extension number table when there is no number after conversion coinciding with the received number, and causes the extension telephone corresponding to the extension number to ring when there is the extension number coinciding with the received number.

(Supplementary note 8) The dial-in incoming call receiving method according to supplementary note 5, wherein the main controller sets in advance whether the dial-in conversion table is used or the extension number table is used when the dial-in incoming call comes and, in the case where the dial-in conversion table is used, retrieves the number after conversion coinciding with received number from the dial-in conversion table when the dial-in incoming call comes, retrieves the extension number coinciding with the received number from the extension number table when there is no number after conversion coinciding with the received number, and causes the extension telephone corresponding to the extension number to ring when there is the extension number coinciding with the received number.

(Supplementary note 9) A program for a dial-in incoming call of a telephone exchange system including a connection interface connecting a communication line with a plurality of extension telephones, a database having a dial-in conversion table registering a received number of a dial-in incoming call from the communication line in association with a number after conversion of the received number, and an extension number table registering the extension telephone in association with an extension number of the extension telephone, and a main controller connected to the connection interface and the database, the program causing a computer configuring the main controller to execute: retrieving an extension number coinciding with the received number from the extension number table when a dial-in incoming call comes from the communication line; and causing an extension telephone corresponding to the extension number to ring when there is an extension number coinciding with the received number.

(Supplementary note 10) The telephone system including the telephone exchange system according to any one of supplementary notes 1 to 4 and a plurality of extension telephones connected to the telephone exchange system.

As described above, the present invention has been described with reference to each embodiment. However, the scope of the present invention is not limited to the above embodiments. Various modifications that a person skilled in the art may understand can be made to the configurations and details of the present invention within the scope not departing from the gist of the present invention.

The present patent application claims a priority based on Japanese Patent Application No. 2010-011922 filed in the Japan Patent Office on Jan. 22, 2010, the entire content of which is hereby incorporated by reference.

INDUSTRIAL APPLICABILITY

The present invention is applicable to a telephone exchange system like a PBX (Private Branch eXchange) or a key telephone system (button telephone device), a receiving method of a dial-in incoming call of the system, and a program for a dial-in incoming call of the system.

DESCRIPTION OF REFERENCE NUMERALS 1 communication line
2 telephone exchange system
3 extension telephone
21 connection interface
22 main controller
23 database
231 dial-in conversion table
232 extension number table

The invention claimed is:
1. A telephone exchange system, comprising:
  a connection interface connecting a communication line with a plurality of extension telephones;
  a database including:
    a dial-in conversion table registering a received number of a dial-in incoming call from the communication line in association with a number after conversion of the received number; and an extension number table registering an extension telephone of the plurality of extension telephones in association with an extension number of the extension telephone; and a main controller, comprising a processor, connected to the connection interface and the database, wherein the main controller sets in advance whether, when the dial-in incoming call comes, the dial-in conversion table is used or the extension number table is used and, in a case where the use of the extension number table is set in advance, retrieves the extension number coinciding with the received number from the extension number table when the dial-in incoming call comes, and causes the extension telephone corresponding to the extension number to ring when there is the extension number coinciding with the received number.

2. A telephone exchange system, comprising:

a connection interface connecting a communication line with a plurality of extension telephones;

a database including:
 a dial-in conversion table registering a received number of a dial-in incoming call from the communication line in association with a number after conversion of the received number; and
 an extension number table registering an extension telephone of the plurality of extension telephones in association with an extension number of the extension telephone; and a main controller, comprising a processor, connected to the connection interface and the database, wherein the main controller sets in advance whether, when the dial-in incoming call comes, the dial-in conversion table is used or the extension number table is used and, in a case where the use of the dial-in conversion table is set in advance, retrieves the number after conversion coinciding with the received number from the dial-in conversion table when the dial-in incoming call comes, retrieves the extension number coinciding with the received number from the extension number table when there is no number after conversion coinciding with the received number, and causes the extension telephone corresponding to the extension number to ring when there is the extension number coinciding with the received number.

3. A dial-in incoming call receiving method of a telephone exchange system including a connection interface connecting a communication line with a plurality of extension telephones, a database including a dial-in conversion table registering a received number of a dial-in incoming call from the communication line in association with a number after conversion of the received number, and an extension number table registering the extension telephone in association with an extension number of the extension telephone, and a main controller, comprising a processor, connected to the connection interface and the database, wherein the main controller executes the dial-in incoming call receiving method, the dial-in incoming call receiving method comprising:
 setting in advance whether, when the dial-in incoming call comes, the dial-in conversion table is used or the extension number table is used; and
 in the case where the use of the extension number table is set in advance, retrieving the extension number coinciding with the received number from the extension number table when the dial-in incoming call comes, and causing the extension telephone corresponding to the extension number to ring when there is the extension number coinciding with the received number.

4. A dial-in incoming call receiving method of a telephone exchange system including a connection interface connecting a communication line with a plurality of extension telephones, a database including a dial-in conversion table registering a received number of a dial-in incoming call from the communication line in association with a number after conversion of the received number, and an extension number table registering the extension telephone in association with an extension number of the extension telephone, and a main controller, comprising a processor, connected to the connection interface and the database, wherein the main controller executes the dial-in incoming call receiving method, the dial-in incoming call receiving method comprising:
 setting in advance whether, when the dial-in incoming call comes, the dial-in conversion table is used or the extension number table is used; and
 in the case where the use of the dial-in conversion table is set in advance, retrieving the number after conversion coinciding with received number from the dial-in conversion table when the dial-in incoming call comes, retrieving the extension number coinciding with the received number from the extension number table when there is no number after conversion coinciding with the received number, and causing the extension telephone corresponding to the extension number to ring when there is the extension number coinciding with the received number.

5. A non-transistory computer readable medium having recorded thereon a program for a dial-in incoming call of a telephone exchange system including a connection interface connecting a communication line with a plurality of extension telephones, a database including a dial-in conversion table registering a received number of a dial-in incoming call from the communication line in association with a number after conversion of the received number, and an extension number table registering the extension telephone in association with an extension number of the extension telephone, and a main controller connected to the connection interface and the database, the program causing a computer configuring the main controller to execute:
 setting in advance whether the dial-in conversion table is used or the extension number table is used when the dial-in incoming call comes;
 in the case where the use of the extension number table is set in advance, retrieving an extension number coinciding with the received number from the extension number table when a dial-in incoming call comes from the communication line; and
 causing an extension telephone corresponding to the extension number to ring when there is an extension number coinciding with the received number.

6. A telephone system, comprising the telephone exchange system according to claim 2, wherein
 the plurality of extension telephones are connected to the telephone exchange system.

7. A telephone system, comprising the telephone exchange system according to claim 1, wherein
 the plurality of extension telephones are connected to the telephone exchange system.

* * * * *